Nov. 8, 1927.
R. R. JOHNSON
RADIATOR PROTECTOR
Filed Nov. 26, 1923
1,648,311
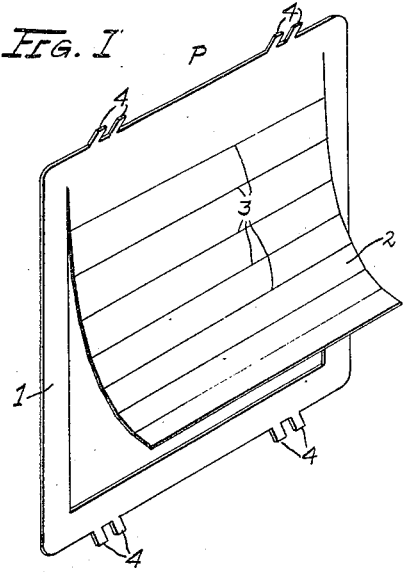
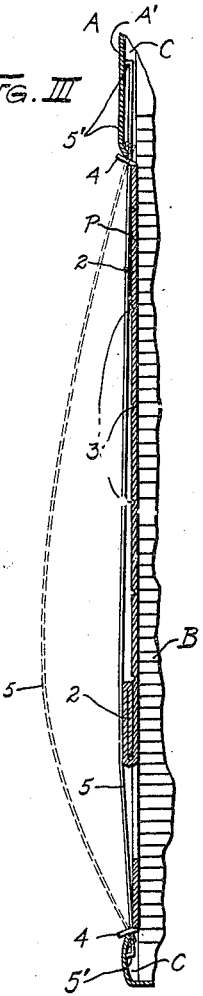
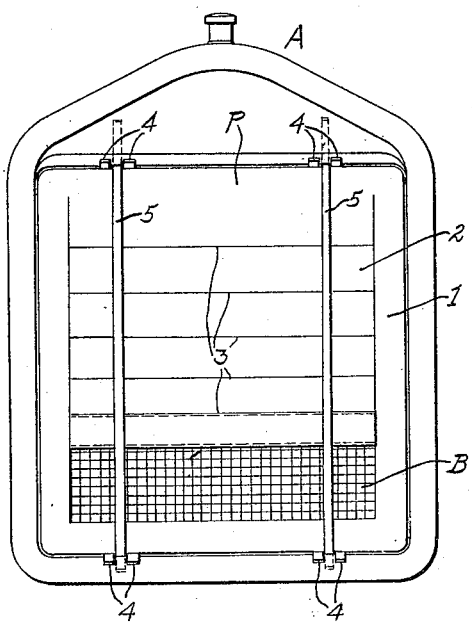
INVENTOR
R. R. Johnson
By Cook & McCauley
ATTORNEYS Patented Nov. 8, 1927.

1,648,311

UNITED STATES PATENT OFFICE.

ROBERT R. JOHNSON, OF ST. LOUIS, MISSOURI.

RADIATOR PROTECTOR.

Application filed November 26, 1923. Serial No. 676,912.

This invention relates to improvements in radiator protectors of the type used on motor vehicles to prevent water within the radiators of said vehicles from freezing, and the main object of the invention is to produce an extremely simple and very inexpensive radiator protector which will function in a very efficient manner when in use. Another object is to produce a simple and inexpensive radiator protector which is provided with a foldable portion whereby the amount of cold air which is permitted to pass through a radiator with which one of my improved protectors is associated may be regulated.

It is, of course, well known that many radiator protectors of the type disclosed herein have been produced, but most of these protectors are comparatively expensive. The main purpose of the present invention is to produce a protector that may be manufactured and sold for a very low price, so that the cost will not prevent anyone from obtaining one, and also which is so inexpensive as to render it possible for automobile dealers to distribute them as an advertising medium.

Briefly stated, my improved radiator protector comprises a single sheet of comparatively heavy paper, or cardboard, which is slitted so as to provide a frame portion and a foldable curtain. The foldable curtain of my improved protector may be adjusted so as to regulate the amount of air passing through the radiator of the motor vehicle and my improved protector includes resilient members for maintaining said foldable curtain in its folded or unfolded condition.

With the foregoing and other objects in view, the invention comprises the novel construction, combination and arrangement of parts hereinafter more specifically described and illustrated in the accompanying drawing, wherein is shown the preferred embodiment of the invention. However, it is to be understood that the invention comprehends changes, variations and modifications which come within the scope of the claims hereunto appended.

Fig. I is a perspective view of my improved radiator protector.

Fig. II is a front elevation of the radiator of a motor vehicle showing my improved protector associated therewith.

Fig. III is an enlarged vertical section through a fragment of a radiator of a motor vehicle showing one of my improved protectors associated therewith.

In the drawing, A designates a radiator of a motor vehicle, which of course may be of any type, said radiator being provided with the usual honeycomb or body portion B through which air passes to cool the water passing through said radiator. The front plate or shell A' of the radiator is separated from the honeycomb or body portion B of said radiator, said plate or shell A' being so located with relation to said honeycomb or body portion as to provide a space as indicated by the reference character C in Fig. III, between the inside face of said plate or shell A' and the outer face of the honeycomb or body portion B.

Arranged adjacent to the front face of the radiator A is my improved protector P, which is preferably formed of a single sheet of comparatively heavy paper or cardboard. The sheet of material of which my improved protector is formed is preferably covered with a protective coating such, for instance, as paraffine so that said sheet will not be rendered unfit for service by damp or wet weather. My improved protector comprises a frame portion 1 and a foldable curtain 2, said foldable curtain 2 being formed by cutting a U-shaped slit in the sheet of material, the material within said U-shaped slit constituting the foldable curtain. The upper ends of the U-shaped slit stop short of the upper marginal edge of the sheet of material of which the protector is formed, so that the frame portion 1 of said protector extends entirely around the foldable curtain 2.

The foldable curtain 2 is scored at a number of points to provide a plurality of lines 3 on which said foldable curtain may be folded, thereby rendering said foldable curtain in effect a member composed of a plurality of sections hinged together. It will be noted by referring to the drawing that those lines 3 which are close to the lower end of the foldable curtain are closer together than those lines 3 which are removed some distance from said lower end of said curtain. In fact, it will be noticed that there is a gradual increase in the distances between adjacent lines as the distance of said lines from the bottom edge of the curtain increases. This is necessary because as the foldable curtain 2 is folded the amount of material in the curved upper and lower portions of the sections of said curtain increases each time that a section of said curtain is folded. Consequently, to keep the sections of approximately the same height when folded the lines on which said curtain is folded must be of varying distance apart when said curtain is unfolded.

Formed integral with the sheet of which the protector is formed are pairs of lugs 4, there being two pairs of lugs at the upper marginal edge of said sheet and two pairs of lugs at the lower marginal edge of said sheet, said lugs at the upper marginal edge of said sheet being in alinement with the lugs at the lower marginal edge of said sheet.

5 designates a pair of retaining devices in the form of strips of resilient material. The strips 5 are arranged adjacent to the outer face of the protector at right angles to the lines on which the curtain 2 is folded, and because of the resiliency of said strips they will exert an inward pressure against said protector. The strips 5 are of such length that the end portions thereof extend beyond the upper and the lower marginal edges of the protector, and when said strips are in use said opposite end portions thereof are located in the space C between the inside face of the front plate of shell A' of the radiator and the front face of the honeycomb or body portion B of said radiator, as shown in Fig. III. Each individual strip 5 is arranged between a pair of the lugs 4 at the upper edge of the protector and an alined pair of lugs 4 at the lower edge of said protector, so that said strips are prevented from being displaced by vibration of the motor vehicle.

In the use of my improved protector, assume that the weather is very cold and that it is desired to prevent the cold air from passing through the radiator. In this event the foldable curtain 2 will be entirely unfolded so that it covers the honeycomb or body portion B of the radiator, and because the resilient strips 5 are exerting an inward pressure against said curtain it will be firmly held in place. Assume now that it is desired to permit some air to pass through the radiator. The strips 5 will be bowed outwardly, as shown by dotted lines in Fig. III, so that the curtain 2 may be folded to any desired height, after which said strips will be permitted to snap into their original positions in contact with said folded curtain, whereby it will be maintained in its folded condition. From the foregoing it is plain that the passage of air through the radiator may be regulated at all times by merely folding or unfolding the curtain 2 as desired.

It will be noted that the opposite end portions of the strip 5 are provided with laterally extended portions 5'. The purpose of these portions 5' is to prevent the strips 5 from being accidentally withdrawn entirely from the radiator when said strips are bowed outwardly to permit the curtain 2 to be folded or unfolded.

I claim:

1. A radiator protector for a motor vehicle having a radiator the shell portion of which is spaced apart from the body portion thereof, comprising a protective sheet adapted to be arranged adjacent to a face of said body portion, and a member whereby said protective sheet is retained in position adjacent to said face, said protective sheet being provided with a pair of lugs between which said member is located, said pair of lugs being located outside of said shell portion and a portion of said member being introduced between said body portion and the shell portion.

2. A radiator protector for motor vehicles comprising a sheet of material having a foldable portion, and means comprising a resilient member arranged at an angle relative to the lines on which said foldable portion is folded whereby said foldable portion is retained in a folded or unfolded condition.

3. A radiator protector for motor vehicles comprising a sheet of material having a foldable portion, and means comprising resilient members arranged at right angles to the lines on which said foldable portion is folded whereby said foldable portion is retained in a folded or unfolded condition, the opposite end portions of said resilient members being engaged by portions of the radiator shell of the motor vehicle.

4. A radiator protector for motor vehicles comprising a sheet of material having a foldable portion, and means comprising strips of resilient material arranged at right angles to the lines on which said foldable portion is folded whereby said foldable portion is retained in a folded or unfolded condition, said strips of resilient material being located adjacent to the front face of said foldable portion, and the opposite end portions of said strips of resilient material being extended beyond certain marginal edges of said sheet of material, said extended end portions of said strips of resilient material being introduced beneath portions of the radiator shell of the motor vehicle.

5. A radiator protector for motor vehicles comprising a sheet of material having a foldable portion, said foldable portion being scored to provide lines on which it may be folded, the distances between adjacent lines being gradually increased as the distances of said lines from the lower edge of said foldable portion is increased.

6. A radiator protector for motor vehicles comprising a sheet of material having a frame portion and a foldable portion, said foldable portion being scored to provide lines on which it may be folded, means comprising a resilient member whereby said foldable portion may be retained in a folded or unfolded condition, and means comprising lugs whereby said resilient member is maintained in its proper position.

In testimony that I claim the foregoing I hereunto affix my signature.

ROBERT R. JOHNSON.